US012627110B2

(12) United States Patent
Sola Larrañaga et al.

(10) Patent No.: US 12,627,110 B2
(45) Date of Patent: May 12, 2026

(54) METHOD AND SYSTEM FOR THE TEMPORAL AND SPECTRAL CHARACTERIZATION OF THE AMPLITUDE AND PHASE OF ULTRASHORT LASER PULSES

(71) Applicants: UNIVERSIDAD DE SALAMANCA, Salamanca (ES); SPHERE ULTRAFAST PHOTONICS, S.L., Boiro a Coruña (ES)

(72) Inventors: Iñigo Juan Sola Larrañaga, Salamanca (ES); Benjamín Alonso Fernández, Salamanca (ES)

(73) Assignees: UNIVERSIDAD DE SALAMANCA, Salamanca (ES); SPHERE ULTRAFAST PHOTONICS, S.L., Boiro a Coruña (ES)

( * ) Notice: Subject to any disclaimer, the term of this patent is extended or adjusted under 35 U.S.C. 154(b) by 866 days.

(21) Appl. No.: 17/787,096

(22) PCT Filed: Dec. 16, 2020

(86) PCT No.: PCT/ES2020/070798
§ 371 (c)(1),
(2) Date: Jun. 17, 2022

(87) PCT Pub. No.: WO2021/123481
PCT Pub. Date: Jun. 24, 2021

(65) Prior Publication Data
US 2022/0407279 A1      Dec. 22, 2022

(30) Foreign Application Priority Data

Dec. 19, 2019    (ES) ................................ ES201931137

(51) Int. Cl.
H01S 3/00          (2006.01)
G01J 3/45          (2006.01)
G01J 11/00         (2006.01)

(52) U.S. Cl.
CPC .............. *H01S 3/0057* (2013.01); *G01J 3/45* (2013.01); *G01J 11/00* (2013.01); *H01S 3/0014* (2013.01); *H01S 3/0078* (2013.01)

(58) Field of Classification Search
CPC .... H01S 3/0057; H01S 3/0014; H01S 3/0078; H01S 3/005; H01S 3/0085; G01J 3/45; G01J 11/00; G01F 1/03
See application file for complete search history.

(56) References Cited

U.S. PATENT DOCUMENTS

| | | | | |
|---|---|---|---|---|
| 6,611,336 B1 * | 8/2003 | Walmsley | ............. | G01J 9/0246 |
| | | | | 356/450 |
| 2002/0057435 A1 | 5/2002 | Trebino et al. | | |
| 2011/0211600 A1 * | 9/2011 | Dantus | .................. | H01S 3/0057 |
| | | | | 372/25 |

FOREIGN PATENT DOCUMENTS

| | | |
|---|---|---|
| EP | 2211430 A2 | 7/2010 |
| EP | 3062075 A1 | 8/2016 |
| WO | 2019003102 A1 | 1/2019 |

OTHER PUBLICATIONS

X. Zhang, 'Temporal Characterization and Intensity Contrast Improvement of Few-cycle Laser Pulses', Dissertation, 2019 (Year: 2019).*

(Continued)

*Primary Examiner* — Xinning(Tom) Niu
(74) *Attorney, Agent, or Firm* — Hayes Soloway PC

(57) ABSTRACT

A method includes steps for creating at least two replicas of an input pulse to be characterised, varying the relative amplitude of the two replicas within a range, creating a nonlinear signal at each case of said amplitude variation, measuring the spectra of the nonlinear signals and recover- (Continued)

ing the spectral amplitude and phase of the input pulse with a proper algorithm. The system includes a replicator for creating at least two replicas of the input pulse and varying their relative amplitude within a range of relative amplitudes, a nonlinear medium, which obtains a nonlinear signal for each relative amplitude, and an analyzer, associated to the nonlinear signal, for measuring and characterising spectrally each nonlinear signal.

15 Claims, 3 Drawing Sheets

(56) References Cited

OTHER PUBLICATIONS

A. Baltuka et al., "Ultrashort Pulse Characterization by Interferometric Spectral Cross-Convolution," in The 4th Pacific Rim Conference on Lasers and Electro-Optics, Technical Digest Series (Optica Publishing Group, 2001) (Year: 2001).*
Xun Gu et al., "An introduction to the characterization of ultrashort laser pulses," Proc. SPIE 6108, Commercial and Biomedical Applications of Ultrafast Lasers VI, 61080A (Feb. 28, 2006) (Year: 2006).*
Ian A. Walmsley, "Characterization of Ultrashort Electromagnetic Pulses", Journal, 2009, 308-437, vol. 1, Advances in Optics and Photonics.
Henry Timmers, "Generating high-contrast, near single-cycle waveforms with third-order dispersion compensation", Article, 2017, 811-814, vol. 42, No. 4, Optics Letters.
Francisco Silva, "Strategies for achieving intense single-cycle pulses with in-line post-compression setups", Article, 2018, 337-340, vol. 43, No. 2, Optics Letters.
A. Wirth, "Synthesized Light Transients", Article, 2011, 195-200, vol. 334, Science.
J.A. Armstrong, "Measurement of picosecond laser pulse widths", Article, 1967, 16-18, vol. 10, No. 16, Applied Physics Letters.
Daniel J. Kane, "Characterization of Arbitrary Femtosecond Pulses using Frequency-Resolved Optical Gating", Journal, 1993, 571-579, vol. 29, No. 2, IEEE Journal of Quantum Electronics.
R. Trebino, "Using phase retrieval to measure the intensity and phase of ultrashort pulses: frequency-resolved optical gating", Journal, 1993, 1101-1111, vol. 10, No. 5, Journal of the Optical Society of America.
Kenneth W. Delong, "Pulse retrieval in frequency-resolved optical gating based on the method of generalized projections", Article, 1994, 2152-2154, vol. 19, No. 24, Optics Letters.

C. Iaconis, "Spectral phase interferometry for direct electric-field reconstruction of ultrashort optical pulses", Article, 1998, 792-794, vol. 23, No. 10, Optics Letters.
T. Oksenhendler, "Self-referenced spectral interferometry", Journal, 2010, 7-12, vol. 99, Applied Physics B.
Vadim V. Lozovoy, "Multiphoton intrapulse interference. IV. Ultrashort laser pulse spectral phase characterization and compensation", Article, 2004, 775-777, vol. 29, No. 7, Optics Letters.
Miguel Miranda, "Simultaneous compression and characterization of ultrashort laser pulses using chirped mirrors and glass wedges", Article, 2012, 688-697, vol. 20, No. 1, Optics Express.
Miguel Miranda, "Characterization of broadband few-cycle laser pulses with the d-scan technique", Article, 2012, 18732-19743, vol. 20, No. 17, Optics Express.
Bingwei Xu, "Quantitative investigation of the multiphoton intrapulse interference phase scan method for simultaneous phase measurement and compensation of femtosecond laser pulses", Journal, 2006, 750-759, vol. 23, No. 4, Journal of the Optical Society of America.
Miguel Miranda, "Fast iterative retrieval algorithm for ultrashort pulse characterization using dispersion scans", Article, 2017, 190-197, vol. 34, No. 1, Journal of the Optical Society of America B.
Benjamin Alonso, "Self-calibrating d-scan: measuring ultrashort laser pulses on-target using an arbitrary pulse compressor", Article, 2018, 21701-8, vol. 8, Scientific Reports.
Esmerando Escoto, "Advanced phase retrieval for dispersion scan: a comparative study", Journal, 2018, 8-19, vol. 35, No. 1, Journal of the Optical Society of America B.
Vincent Loriot, "Self-referenced characterization of femtosecond laser pulses by chirp scan", Article, 2013, 1-15, vol. 21, No. 21, Optics Express.
R.M.A. Azzam, "Polarization michelson interferometer (POLMINT): its use for polarization modulation and temporal pulse shearing", Journal, 1993, 19-23, vol. 98, Optics Communications.
Benjamin Alonso, "Compact in-line temporal measurement of laser pulses with amplitude swing", Article, 2020, 1-14, vol. 28, No. 10, Optics Express.
Andrius Baltuska, "Ultrashort pulse characterization by interferometric spectral cross-convolution", Article, 2001, 1-2, IEEE Service Center.
Ahmed B. Sharba, "Single shot complete characterization of femtosecond laser pulses employing self-phase modulation", Article, 2019, 1-8, vol. 29, Laser Physics.
Miguel Miranda, "Spatiotemporal characterization of ultrashort laser pulses using spatially resolved Fourier transform spectrometry", Article, 2014, 5142-5145, vol. 39, No. 17, Optics Letters.

* cited by examiner

METHOD AND SYSTEM FOR THE TEMPORAL AND SPECTRAL CHARACTERIZATION OF THE AMPLITUDE AND PHASE OF ULTRASHORT LASER PULSES

CROSS-REFERENCE TO RELATED APPLICATIONS AND PRIORITY

This patent application claims priority from PCT Application No. PCT/ES2020/070798 filed Dec. 16, 2020, which claims priority from Spanish Patent Application No. P2019 filed Dec. 19, 2019. Each of these patent applications are herein incorporated by reference in their entirety.

DESCRIPTION

Object of the Invention

The present disclosure relates to laser systems and laser pulse characterization methods and presents a method and system for the characterization of ultrashort laser pulses.

BACKGROUND OF THE INVENTION

The arising of ultrafast optics and the increasing of its applications came in parallel to the need of characterizing ultrashort laser pulses [1]. As those are turning into increasingly complex and short (to the extreme of single-cycle regime [2,3] or even shorter [4]), the pulse measurements are becoming more and more demanding.

The first characterization techniques were based on the pulse autocorrelation [5], obtained from scanning the time delay between two pulse replicas and the measurement of the power of a nonlinear signal depending on the time overlap of both replicas. These methods give an approximate idea of the pulse characteristics but are not able to reconstruct the actual pulse or to provide its spectral phase.

Later, the FROG technique [6] used a similar scheme but acquiring the nonlinear signal spectra, instead of the overall nonlinear signal power. The so-called FROG spectrograms, consisting in the nonlinear spectra depending on the replicas delay, encode information of the spectral phase and, by means of reconstruction algorithms [7,8], succeed in reconstructing the pulses.

Some years later, the SPIDER technique [9] was invented using spectral interferometry, where both replicas remained at a fixed time delay and a spectral shearing was introduced within a nonlinear process. Thus, the derivative of the pulse spectral phase is encoded in the spectral interference of both replicas and extracted by means of Fourier analysis.

Another evolution of the spectral interferometry strategy is the self-referenced spectral interferometry (Wizzler) [10], where the reference pulse is cleaned in time, obtaining a flat spectral phase.

A different strategy was presented in 2004 with pulse characterization using phase scanning, the so-called multiphoton intrapulse interference phase scan (MIIPS) [11,12]. The general idea consists in introducing a known set of spectral phases in the test pulse and to observe the second order harmonic generation (SHG) signal of the resulting pulse. The unknown pulse group delay dispersion (GDD) can be therefore extracted at a given wavelength by calculating the amount of GDD within the scan range needed to optimize the SHG signal at that wavelength.

Later, the d-scan technique [13] used the spectral phase scan concept with some practical modifications and introduced retrieval algorithms [14-17] to reconstruct the spectral phase of the test pulse. A related technique was proposed in [18], using an acousto-optic programmable dispersive filter (AOPDF) for the known spectral phase scan and an algorithm to reconstruct both the spectral amplitude and phase of the pulse.

In general, the main part of the time pulse characterization operates under laboratory stability conditions. A major challenge nowadays is to implement characterization set-ups robust and simple enough to work under less controlled conditions.

Thus, one of the main goals of the present work is to study the idea and implementation of reconstruction systems capable of facing those demands. On the other hand, for designing a characterization set-up, it is needed to take into account the time duration ranges and central wavelength of the pulse to reconstruct, since they are major conditionings for the system implementation. Here, we aimed to develop a simple and robust system for pulse characterization, presenting an in-line configuration, being able to be adapted easily to a broad range of pulse durations.

Here we present a different approach to the pulse reconstruction by using some delayed replicas and varying the relative amplitude between them. The time delay can be chosen in such a way that the two replicas can overlap on time. By varying the relative amplitude between them, the resulting time evolution changes because of the pulse interference in the time domain.

If subsequently the resulting pulse generates a nonlinear signal (e.g., but not limited to, by second harmonic generation, SHG), the nonlinear spectrum will depend strongly on its time evolution. Therefore, by scanning the relative amplitude between the two replicas the spectrum of the nonlinear signal may change, encoding information about the original input pulse.

DESCRIPTION OF THE INVENTION

The present invention discloses a method and system for the temporal and spectral characterization of the amplitude and phase of ultrashort laser pulses.

Some reconstruction techniques (e.g., autocorrelation, FROG) consist in a time delay scan of two replicas with constant amplitude (it can be done either in collinear or non-collinear configurations) of an original input pulse and the generation, at each time delay, of a nonlinear signal yield from the interaction of a resulting time amplitude overlapped distribution with a nonlinear medium.

Typically, the creation of the replicas and the time delay scan is performed by using an interferometer, what makes set-ups sensitive to noise, although several alternate and more compact configurations have been proposed [16-18]. The SPIDER technique, on the other hand, uses a fixed delay between the replicas and techniques such as MIIPS and d-scan do not used pulse replicas, being much more stable because of their inline configuration.

In the present invention a different technique for pulse reconstruction is disclosed. By using at least two replicas of an ultrashort pulse, shifted by a given temporal delay and varying the relative amplitude between them. The ultrashort pulse can be a scalar pulse with constant linear polarization or a vector pulse, with spectral and temporal evolving polarization.

The temporal delay can be chosen in such a way that the at least two replicas can overlap on time. By varying the relative amplitude between them, the resulting time evolution changes because of the ultrashort pulse interference in the time domain. If subsequently the resulting pulse generates a nonlinear signal (e.g., but not limited to, by second harmonic generation, SHG), the nonlinear spectra will strongly depend on its time evolution.

The amplitude, relative amplitude and the variation of the relative amplitude refers to the amplitude of one or more replicas, and where the variation can be either in the module of the amplitude or in the module and phase of the complex amplitude.

Therefore, by scanning the amplitude balance between the at least two replicas, the spectra of the nonlinear signal may change, encoding information about the original input ultrashort pulse. The collection of the nonlinear spectra depending on the relative amplitude values of the at least two replicas is said to be the nonlinear spectra signal trace. An algorithm recovers the temporal and spectral input pulse structure from the said trace of the relative amplitudes of the replicas.

It is disclosed a method for characterizing ultrashort laser pulses, the method comprising:

a pulse manipulation stage, which comprises the steps of:
creating at least two replicas of an input pulse to be characterized with a temporal delay between them, being the at least two replicas characterized by a relative amplitude;
varying the relative amplitude of the at least two replicas, which can be done either uniformly or non-uniformly, between a lower limit and an upper limit of a range, continuously or in a stepwise fashion along the range, in order to obtain a range of relative amplitudes, meaning the variation of values of the relative amplitudes of the at least two replicas, between the at least two replicas;

a nonlinear stage, which comprises the step of:
applying a nonlinear process to the at least two replicas, obtaining a nonlinear signal for each value of relative amplitudes of the at least two replicas;

a detection stage, which comprises the steps of:
measuring and acquiring a spectrum of each nonlinear signal, obtaining a two-dimensional trace;

a processing and reconstructing stage, which comprises the steps of:
recovering the temporal and spectral amplitude and phase of the input pulse, applying an algorithm to the two-dimensional nonlinear signal spectra.

The spectrum of the input pulse can be directly measured an acquired, to be used within the processing and reconstruction stage in order to calculate the spectral phase and the temporal amplitude and phase of the input pulse using the said algorithm.

The linear spectrum of the at least two replicas as a function of their varying amplitudes can be measured and acquired, to be used within the processing and reconstruction stage in order to calculate the spectral and the temporal amplitude and phase of the input pulse using the said algorithm.

The particular sequence of steps shown herein has only an illustrative purpose. Therefore, it could be altered without departing from the disclosure. In consequence, unless otherwise stated, the steps described are therefore unordered meaning that, when possible, the steps can be performed in any convenient or desirable order such that the same objective is achieved.

It is possible that the spectra of the nonlinear signal generated by the at least two replicas present clippings and/or hollow regions, and the processing and reconstruction stage is still able to calculate the spectral and temporal amplitude and phase of the input pulse.

It is possible that the spectra of the nonlinear signal generated by the at least two replicas are not calibrated, and the processing and reconstruction stage is still able to calculate the spectral and temporal amplitude and phase of the input pulse, with the possibility of the processing stage including a step for the calibration of said nonlinear signal.

The nonlinear process in the nonlinear stage can comprise second-harmonic generation, sum-frequency generation, difference-frequency generation, transverse second-harmonic generation, transverse sum-frequency generation, transverse difference-frequency generation, the optical Kerr effect and related nonlinear phase modulation effects, cross-polarized wave generation, and/or third- and higher-order harmonic generation, self-diffraction or a combination thereof.

The applied nonlinear process in the nonlinear stage, and consequently the nonlinear signal, can comprise a nonlinear effect that affects the fundamental spectra, the beam direction or the polarization of the pulse of the at least two replicas resulting from the amplitude scan, e.g., but not limited to, second-harmonic generation, sum-frequency generation, difference-frequency generation, the optical Kerr effect, self- and cross-phase modulation, cross-polarized wave generation, third- and higher-order harmonic generation, self-diffraction, or combinations thereof.

In the method, the nonlinear signal can be detected overlapped with a remaining part of the input pulse or of the (linear) signal of the at least two replicas, in order to be used to calculate the absolute phase (carrier envelope phase) of the input pulse.

The present invention also comprises a system for the characterization of ultrashort pulses. The system comprises the elements that are described below:

means for creating at least two replicas of an input pulse, varying their relative amplitude, and obtaining a range of relative amplitudes, a nonlinear medium, associated to the means for creating the at least two replicas, which obtains a nonlinear signal for each relative amplitude, analysing means, associated to the nonlinear medium, for measuring and characterising spectrally the nonlinear signal for each relative amplitude.

Additionally, the system can comprise one or more of the following elements:

a first optical element, positioned between the means for creating at least two replicas and the nonlinear medium, intended to focus the at least two replicas into the nonlinear medium, and/or a filtering element positioned between the nonlinear medium and the analysing means, intended to filter the nonlinear signal, and/or a second optical element, positioned between the nonlinear medium and the analysing means, or the filtering element and the analysing means, intended to focus and collect the nonlinear signal or the filtered nonlinear signal, respectively, and/or a numerical analysis unit, associated to the analysing means, for calculating the spectral and the temporal amplitude and phase of the input pulse, and/or further analysing means, associated to the input pulse and to the numerical analysis unit, intended to measure the spectral amplitude of the input pulse, and/or further analysing means, associated to the means for creating the at least two replicas of the input pulse and to the numerical analysis unit, intended to measure the linear spectrum of the at least two replicas.

In an embodiment, the means for creating at least two replicas comprise one or more elements that, by rotating, vary the relative amplitudes between the at least two replicas of the input pulse and introduce the time delay between the at least two replicas as well as the relative amplitude variation. The means for creating at least two replicas also comprise a polarizing element intended to select the polarization projection onto a given direction.

In an embodiment, the means for creating at least two replicas comprise a birefringent element or a set of birefringent elements and a polarizing element or set of polarizing elements for the generation of the two replicas of the input pulse and the relative amplitude between them is achieved by the rotation of at least one of the referred birefringent elements.

In an embodiment, the means for creating at least two replicas comprise an interferometer where the relative amplitudes between its arms are used for the generation of the two replicas of the pulse to be characterised and the varying relative amplitude between them.

In an embodiment, the means for creating at least two replicas comprise a light modulator for the generation of the two replicas of the pulse to be characterised and the relative amplitude between them is achieved by changing the modulator conditions. The modulator device can be an acousto-optics programmable dispersive filter, a liquid crystal, any spatial light modulator controlled electrically, mechanically or optically, or other type of device.

In an embodiment, the means for creating at least two replicas comprise a birefringent element or a set of birefringent elements exhibiting a birefringence depending on at least one spatial coordinate, which is used to introduce the variation of the relative amplitudes encoded at different positions of the said spatial coordinate.

In an embodiment, the means for varying the relative amplitude between the at least two replicas can comprise one or more elements which can rotate or translate, introducing the time delay between the replicas and the relative amplitude variation, and selecting the polarization projection onto a given direction by means of a polarizing element.

In an embodiment, the means for varying the relative amplitude between the at least two replicas can comprise a set of optical components, including one or more birefringent wedges, anisotropic elements, interferometers, acousto-optic modulators, liquid crystal devices and polarizing elements, introducing the time delay and the variation of the relative amplitude between said replicas with respect to a spatial coordinate, being compatible with measuring and characterising spectrally the nonlinear signal for each relative amplitude in a single acquisition (with single laser shot or average or multiple shots).

The first optical element can comprise, but not limited to, lenses, optical fibres, GRIN lenses, flat or curved mirrors, are used to focus the at least two replicas onto the nonlinear medium to generate the nonlinear signal.

The filtering element can comprise an optical element or set of optical elements comprising, but not limited to, dichroic optical elements, spectral filters, spatial masks, linear polarizers or polarizing cubes, and they are used to separate the linear signal from the nonlinear signal.

The second optical element can comprise, but not limited to, lenses, optical fibres, GRIN lenses, or flat or curved mirrors, to collect the nonlinear signal.

The analysing means can comprise spectrally resolved sensors including, but not limited to, monochromators, spectrometers based on CCD or CMOS cameras or unidimensional detectors, intended to acquire, analyse and record the spectra of the linear signal and/or nonlinear signal.

The numerical analysis unit can comprise an electronic data processor configured to calculate the spectral phase of the input pulse, from the amplitude spectra of the nonlinear signal measured for each of the used relative amplitudes between the replicas, and from the linear spectrum of the input pulse, either whether this linear spectrum is directly measured from the input pulse or retrieved from the measured nonlinear signal.

In an embodiment, the spectral phase of the pulse to be characterised is worked out by means of a numerical algorithm including, but not limited to, an iterative algorithm for approximating the retrieved spectral phase to the actual spectral phase of the input pulse in a number of iterations.

In an embodiment, the algorithm comprises a numerical, analytical or numerical-analytical algorithm, including, but not limiting the scope of the invention, optimization, iterative optimization, nonlinear optimization, less-squares fitting, genetic, evolution, machine learning, deep learning, neural networks, and projections-based algorithms, or combinations thereof.

In an embodiment, applying a numerical algorithm for the retrieval of the spectral phase of the input pulse comprises to parametrise the said spectral phase function including, but not limited to, a Taylor series expansion, a Fourier series expansion, direct discretization and interpolation of the phase or its derivatives, a set of basic functions for a function space, or combinations of them.

DESCRIPTION OF THE DRAWINGS

To complement the description being made and in order to aid towards a better understanding of the characteristics of the invention, in accordance with a preferred example of practical embodiment thereof, a ser of drawings is attached as an integral part of said description wherein, with illustrative and non-limiting character, the following has been represented.

PREFERRED EMBODIMENT OF THE INVENTION

The present disclosure presents a method and system for the temporal and spectral reconstruction and characterization of ultrashort laser pulses, which can be scalar pulses with a constant linear polarization or vector pulses, with spectral and temporal dependent polarization.

The method comprises steps for creating two replicas (21) of an input pulse (1) to be characterised, varying the relative amplitude of the two replicas (21) along a scan (either scanning or spatially encoded), continuously or step-by-step, creating at each case of said scan a nonlinear signal (31), measuring the spectra of the nonlinear signals (31) and recovering the spectral phase (and possibly the spectral amplitude) of the input pulse (1) and its complex amplitude in the time domain by means of a proper algorithm.

Specifically, it is disclosed a method for characterizing ultrashort laser pulses, the method comprising:

a pulse manipulation stage, which comprises the steps of:
  creating two replicas (21) of an input pulse (1) to be characterized with a temporal delay between them, wherein the two replicas (21) have a relative amplitude;
  varying the relative amplitude of the two replicas (21) in order to obtain a range of relative amplitudes between the two replicas (21);
a nonlinear stage, which comprises the steps of:
  applying a nonlinear process to the two replicas (21), obtaining a nonlinear signal (31) for each value of relative amplitudes of the at least two replicas (21);
a detection stage, which comprises the steps of:
  measuring and acquiring the spectra of the nonlinear signals (31), which depends on the relative amplitude between the two replicas (21), obtaining a two-dimensional trace;
  measuring and acquiring the spectral amplitude of the input pulse (1);
a processing and reconstructing stage, which comprises the steps of:
  calculating with an algorithm the spectral phase of the input pulse (1), applying the algorithm to the nonlinear signal (31) spectra; and
  calculating the temporal amplitude and phase of the input pulse (1) to be characterised applying, preferably, an inverse Fourier transform to the measured linear spectrum and to the retrieved spectral phase.

The method can additionally comprise the step of overlapping the spectra of the nonlinear signal (31) of the at least two replicas (21) with a remaining intentionally unfiltered part of the input pulse (1) or of the linear signal of the at least two replicas (21), and using it to calculate the absolute phase (carrier envelope phase) of the input pulse (1).

Figure 6:
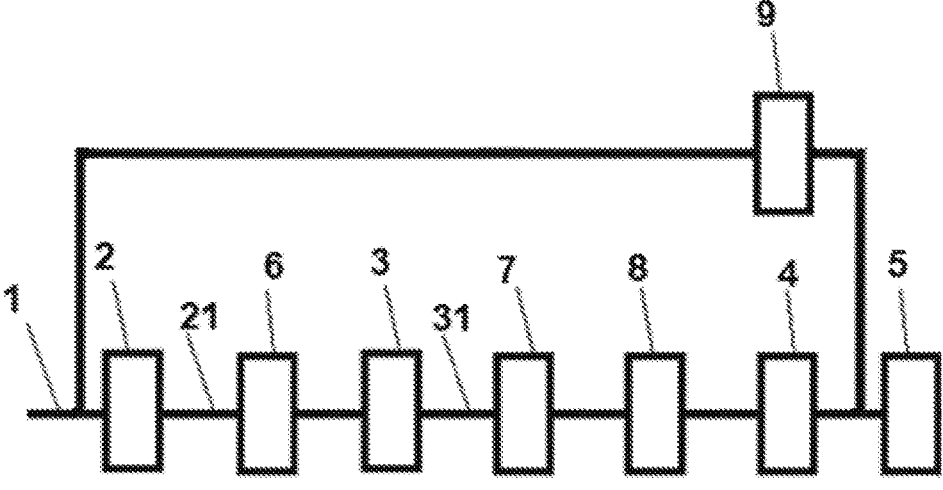
FIG. 6.—Shows a simplified scheme of the system.

The present invention also comprises a system, shown in FIG. 6, for the characterization of ultrashort laser pulses. The system comprises the elements that are described below:

means for creating at least two replicas (2) of an input pulse (1) and varying their relative amplitude, obtaining at least two resulting replicas (21),
a nonlinear medium (3), associated to the means for creating at least two replicas (2), which obtains a nonlinear signal (31) for each relative amplitude of the at least two resulting replicas (21),
a first optical element (6), positioned between the means (2) for creating at least two replicas (21) and the nonlinear medium (3), intended to focus the at least two resulting replicas into the nonlinear medium (3),
analysing means (4), associated to the nonlinear medium (3), for measuring and characterising spectrally the nonlinear signal (31) for each resulting pulse,
a filtering element (7) positioned between the nonlinear medium (3) and the analysing means (4), intended to filter the nonlinear signal (31),
a second optical element (8), positioned between the filtering element (7) and the analysing means (4), intended to focus the filtered nonlinear signal (31) into the analysing means (4),
a numerical analysis unit (5), associated to the analysing means (4), for calculating the spectral phase, and
further analysing means (9), associated to the input pulse (1) and to the numerical analysis unit (5), intended to measure the spectral amplitude of the input pulse (1).

As an example, a first embodiment of the invention consists on:

the means (2) for creating two replicas (21) which comprise a rotating retardation waveplate, and a linear polarizer,
the first optical element (6) which comprises focusing optics,
the nonlinear medium (3) which is a second harmonic generation material,
the filtering element (7) which comprises optics to separate fundamental from nonlinear radiation, and
the analysing means (4) and the further analysing means (9).

Figure 1:
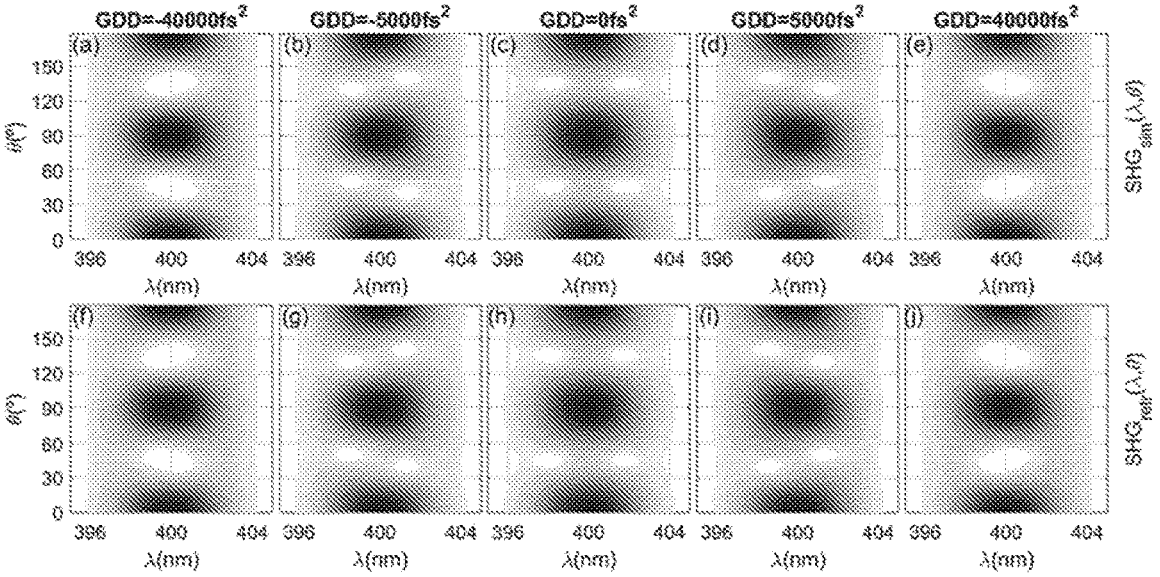
FIG. 1.—Shows, in row 1 simulated, and retrieved in row 2, the nonlinear signal spectra. Different Group Delay Dispersion (GDD) values of the input pulse are represented in the columns.

Based on said first embodiment, FIG. 1 shows the simulated (row 1) and retrieved (row 2) nonlinear spectra signal (31) corresponding to the input pulse (1), which has a duration of 100 fs (Fourier-limit condition) full-width half maximum (FWHM) with central wavelength at 800 nm, considering different GDD represented in the columns, GDD=−40000 $fs^2$, −5000 $fs^2$, 0 $fs^2$, +5000 $fs^2$, +40000 $fs^2$, respectively. Angle $\theta$ represents the orientation of the fast axis of the retardation waveplate. The input pulse (1) is linearly polarized in the x-axis and the linear polarizer in the x-axis is placed after the retardation waveplate and before the second harmonic generation material.

Figure 2:
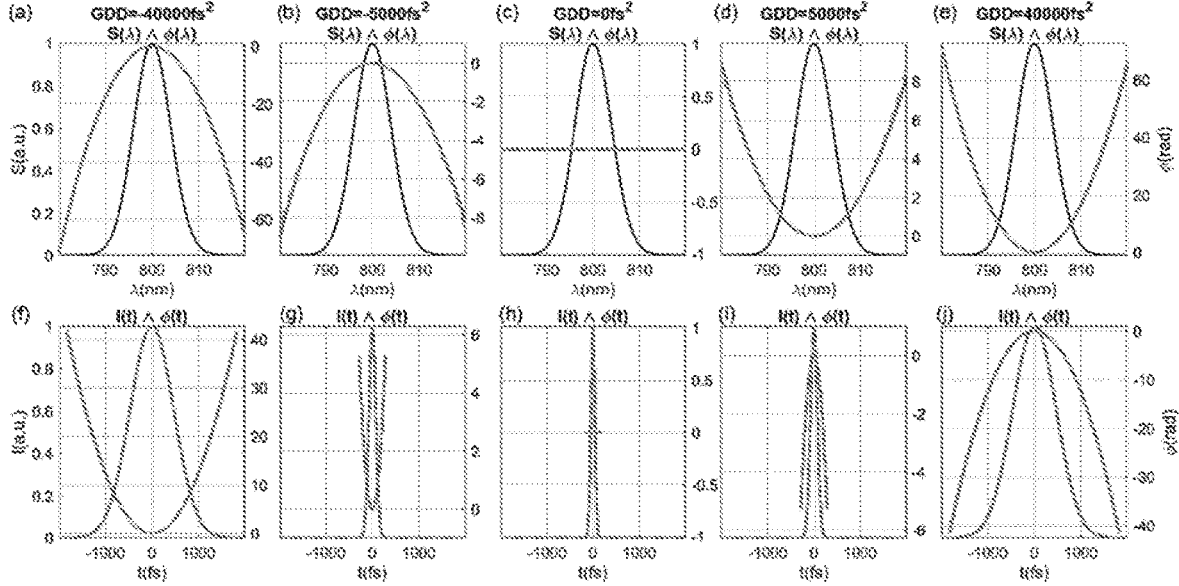
FIG. 2.—Shows, in row 1 the simulated spectrum (black), phase (solid dark grey) and retrieved spectral phase (dashed light grey). In row 2 the simulated (solid dark grey) and retrieved (dashed light grey) temporal intensity and phase. Different GDDs are represented in the columns.

After applying the algorithm, FIG. 2 presents the comparison between the simulated and retrieved pulses at each of the FIG. 1 GDD cases: (row 1) Simulated spectra (black) and simulated (dark grey) and retrieved (light grey) spectral phase; (row 2) Simulated (dark grey) and retrieved (light grey) temporal intensity and phase. The different GDD values of the input pulse are represented in the columns, GDD=−40000 $fs^2$, −5000 $fs^2$, 0 $fs^2$, +5000 $fs^2$, +40000 $fs^2$, respectively. The agreement between simulations and retrievals is good.

Figure 3:
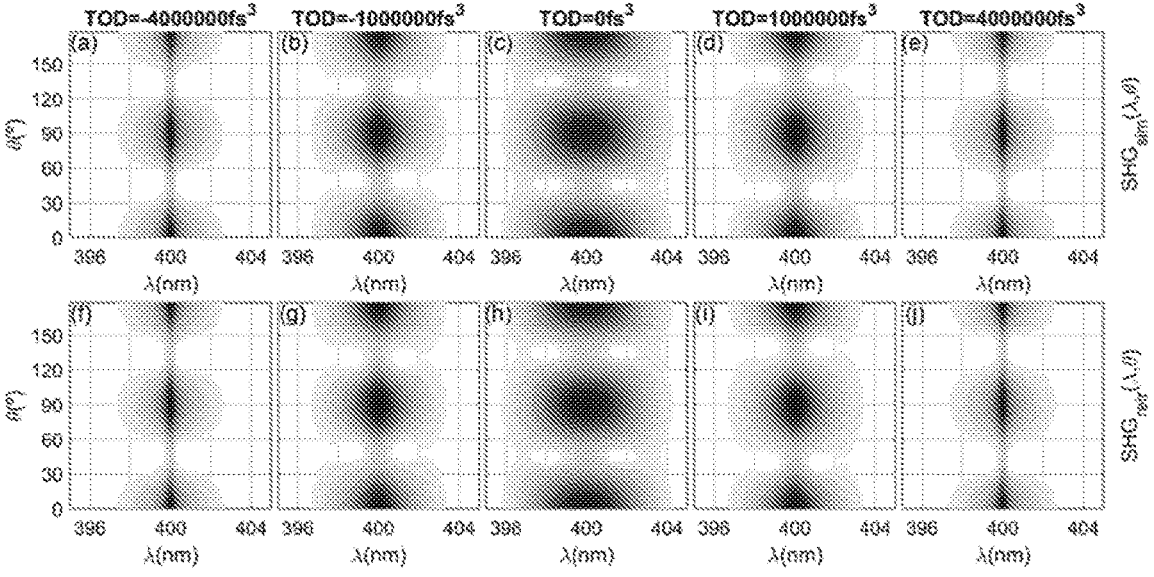
FIG. 3.—Shows, in row 1 the simulated and in row 2, the retrieved nonlinear signal spectra. Different Third Order Dispersion (TOD) values of the input pulse are represented in the columns.

In another example, using the first embodiment of the invention, FIG. 3 shows the simulated (row 1) and retrieved (row 2) nonlinear spectra signal of the input pulse (1) presenting a duration of 100 fs full width half maximum (FWHM) with central wavelength at 800 nm, considering different TOD represented in the columns, TOD=−4000000 $fs^3$, −1000000 $fs^3$, 0 $fs^3$, +1000000 $fs^3$, +4000000 $fs^3$, respectively.

Figure 4:
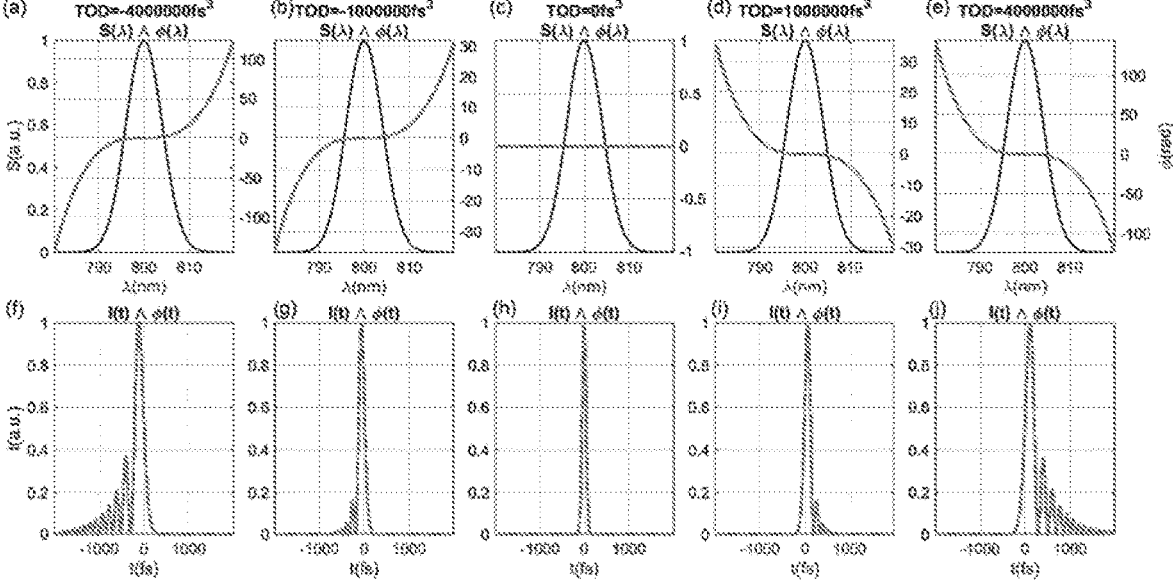
FIG. 4.—Shows, in row 1, the simulated spectrum (black), phase (solid dark grey) and retrieved spectral phase (dashed light grey). In row 2 the simulated (solid dark grey) and retrieved (dashed light grey) temporal intensity. Different TODs are represented in the columns.

After applying the algorithm, FIG. 4 presents the comparison between both simulations and retrieved pulses at each of FIG. 3 TOD cases: (row 1) Simulated spectra (black)

and simulated (dark grey) and retrieved (light grey) spectral phase; (row 2) Simulated (dark grey) and retrieved (light grey) temporal intensity. The different TOD values of the pulse to be characterised are represented in the columns, TOD=−4000000 $fs^3$, −1000000 $fs^3$, 0 $fs^3$, +1000000 $fs^3$, +4000000 $fs^3$, respectively. The agreement between simulations and retrievals is good.

Figure 5:
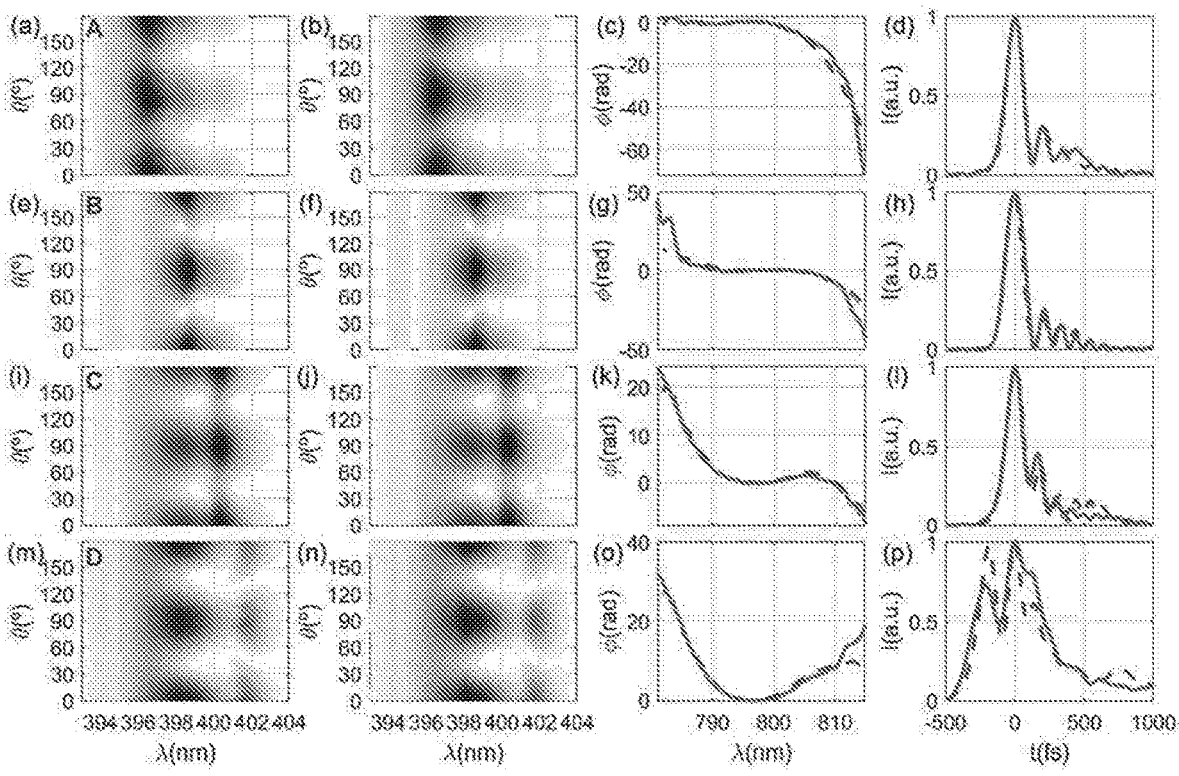
FIG. 5.—Shows, in column 1, the experimental nonlinear signal spectra; in column 2 the corresponding signal retrieved by the algorithm. The retrieved spectral phases (column 3, solid light grey curve) and time domain pulse intensities (column 4, solid light grey curve) obtained with the present method are compared to the corresponding retrieved spectral phase (column 3, dashed dark grey curve) and time domain pulse intensities (column 4, dashed dark grey curve) obtained from a self-calibrating d-scan. Rows A-D correspond to different pulse compression cases.

As another example, we show an experimental comparison shown in FIG. 5, between the present method and the d-scan technique in its self-calibrated version [16,19]: (column 1) Experimental nonlinear spectra signal traces; (column 2) corresponding retrieved traces. The retrieved spectral phases (column 3, light grey curve) and time domain pulse intensities (column 4, light grey curve) are compared to the corresponding retrieved spectral phases (column 3, dark grey curve) and time domain pulse intensities (column 4, dark grey curve) from the self-calibrating d-scan. Rows A-D correspond to different pulse compression cases. The agreement between both techniques is good, validating the results.

The following references should be considered herewith incorporated in their entirety:

1. I. A. Walmsley and C. Dorrer, "Characterization of ultrashort electromagnetic pulses," Adv. Opt. Photonics 1, 308-437 (2009).
2. H. Timmers, Y. Kobayashi, K. F. Chang, M. Reduzzi, D. M. Neumark, and S. R. Leone, "Generating high-contrast, near single-cycle waveforms with third-order dispersion compensation," Opt. Lett. 42, 811 (2017).
3. F. Silva, B. Alonso, W. Holgado, R. Romero, J. S. A. N. Roman, E. C. Jarque, H. Koop, V. Pervak, H. Crespo, and I. J. Sola, "Strategies for achieving intense single-cycle pulses with in-line post-compression setups," Opt. Lett. 43, 337-340 (2018).
4. A. Wirth, M. T. Hassan, I. Grguras, J. Gagnon, A. Moulet, T. T. Luu, S. Pabst, R. Santra, Z. A. Alahmed, A. M. Azzeer, V. S. Yakovlev, V. Pervak, F. Krausz, and E. Goulielmakis, "Synthesized Light Transients," Science (80). 334, 195-200 (2011).
5. J. A. Armstrong, "Measurement of picosecond laser pulse widths," Appl. Phys. Lett. 10, 16-18 (1967).
6. D. J. Kane and R. Trebino, "Characterisation of arbitrary femtosecond pulses using frequency-resolved optical gating," IEEE J. Quantum Electron. 29, 571-579 (1993).
7. R. Trebino and D. J. Kane, "Using phase retrieval to measure the intensity and phase of ultrashort pulses: frequency-resolved optical gating," J. Opt. Soc. Am. A 10, 1101-1111 (1993).
8. K. W. DeLong, B. Kohler, K. Wilson, D. N. Fittinghoff, and R. Trebino, "Pulse retrieval in frequency-resolved optical gating based on the method of generalized projections," Opt. Lett. 19, 2152 (1994).
9. C. Iaconis and I. A. Walmsley, "Spectral phase interferometry for direct electric-field reconstruction of ultrashort optical pulses," Opt. Lett. 23, 792-794 (1998).
10. T. Oksenhendler, S. Coudreau, N. Forget, V. Crozatier, S. Grabielle, R. Herzog, O. Gobert, and D. Kaplan, "Self-referenced spectral interferometry," Appl. Phys. B-Lasers Opt. 99, 7-12 (2010).
11. V. V. Lozovoy, I. Pastirk, and M. Dantus, "Multiphoton intrapulse interference IV Ultrashort laser pulse spectral phase characterization and compensation," Opt. Lett. 29, 775 (2004).
12. B. Xu, J. M. Gunn, J. M. Dela Cruz, V. V. Lozovoy, and M. Dantus, "Quantitative investigation of the multiphoton intrapulse interference phase scan method for simultaneous phase measurement and compensation of femtosecond laser pulses," J. Opt. Soc. Am. B 23, 750 (2006).
13. M. Miranda, T. Fordell, C. Arnold, A. L'Huillier, and H. Crespo, "Simultaneous compression and characterization of ultrashort laser pulses using chirped mirrors and glass wedges," Opt. Express 20, 688-697 (2012).
14. M. Miranda, C. L. Arnold, T. Fordell, F. Silva, B. Alonso, R. Weigand, A. L'Huillier, and H. Crespo, "Characterization of broadband few-cycle laser pulses with the d-scan technique," Opt. Express 20, 18732-18743 (2012).
15. M. Miranda, J. Penedones, C. Guo, A. Harth, M. Louisy, L. Neoričić, A. L'Huillier, and C. L. Arnold, "Fast iterative retrieval algorithm for ultrashort pulse characterization using dispersion scans," J. Opt. Soc. Am. B 34, 190-197 (2017).
16. B. Alonso, Í. J. Sola, and H. Crespo, "Self-calibrating d-scan: Measuring ultrashort laser pulses on-Target using an arbitrary pulse compressor," Sci. Rep. 8, 3264 (2018).
17. E. Escoto, A. Tajalli, T. Nagy, and G. Steinmeyer, "Advanced phase retrieval for dispersion scan: a comparative study," J. Opt. Soc. Am. B 35, 8-19 (2018).
18. V. Loriot, G. Gitzinger, and N. Forget, "Self-referenced characterization of femtosecond laser pulses by chirp scan," Opt. Express 21, 24879 (2013).
19. B. Alonso Fernandez, Í. J. Sola Larranaga, and H. M. Paiva Rebelo Cerejo Crespo, "Method and system for characterization and compression of ultrashort pulses. WO/2019/003102," (2017).

The invention claimed is:

1. A method for the temporal and spectral characterization of the amplitude and phase of ultrashort laser pulses, wherein the method comprises the steps of:

a pulse manipulation stage, which comprises the steps of:
creating at least two replicas of an input pulse to be characterized, with a temporal delay between them, having the at least two replicas a relative amplitude;
varying the relative amplitude of the at least two replicas, between a lower limit and an upper limit, in order to obtain a range of relative amplitudes of the at least two replicas;

a nonlinear stage, which comprises the steps of:
applying a nonlinear process to the at least two replicas, obtaining a nonlinear signal for each value of relative amplitudes of the at least two replicas;

a detection stage, which comprises the steps of:
measuring and acquiring a spectrum of each nonlinear signal, obtaining a two-dimensional trace;

a processing and reconstructing stage, which comprises the steps of:
recovering the temporal and spectral amplitude and phase of the input pulse, applying an algorithm to the two-dimensional nonlinear signal spectra.

2. The method of claim 1, further comprising the step of measuring and acquiring the spectrum of the input pulse to be used in the processing and reconstruction stage.

3. The method of claim 1, wherein varying the relative amplitude of the at least two replicas can be in the module of the amplitude or in the module and phase of the complex amplitude.

4. The method of claim 1, further comprising the step of overlapping the spectra of the nonlinear signal of the at least two replicas with a remaining intentionally unfiltered part of the input pulse or of the linear signal of the at least two replicas, and using it to calculate the absolute phase of the input pulse.

5. The method of claim 1, wherein measuring the linear spectrum of the at least two replicas as a function of their varying amplitudes, to be used in the processing and reconstruction stage.

6. A system for the characterization of ultrashort pulses, which comprises:

a replicator for creating at least two replicas of an input pulse, varying their relative amplitude, and obtaining a range of relative amplitudes, wherein the at least two replicas have a temporal delay between them and a relative amplitude, and wherein varying comprises varying the relative amplitude between a lower limit and an upper limit;

a nonlinear medium, associated to the replicator, configured to apply a nonlinear process to the at least two replicas which produces a nonlinear signal for each relative amplitude of the at least two replicas; and an analyzer, associated to the nonlinear medium, for measuring and characterizing spectrally each nonlinear signal, the analyzer configured to measure and acquire a spectrum of each nonlinear signal, obtaining a two-dimensional trace, and to recover the temporal and spectral amplitude and phase of the input pulse by applying an algorithm to the two-dimensional nonlinear signal spectra.

7. The system of claim 6, further comprising a first optical element, positioned between the means for creating at least two replicas and the nonlinear medium.

8. The system of claim 6, further comprising a filtering element positioned between the nonlinear medium and the analyzer.

9. The system of claim 6, further comprising a second optical element, positioned between the nonlinear medium and the analyzer.

10. The system of claim 6, further comprising a numerical analysis unit with an electronic data processor, associated to the analyzer, intended for calculating the spectral and temporal amplitude and phase of the input pulse.

11. The system of claim 10, comprising further the analyzer, associated to the input pulse and to the numerical analysis unit, intended to measure the spectral amplitude of the input pulse.

12. The system of claim 10, comprising further the analyzer, associated to the replicator of the input pulse and to the numerical analysis unit, intended to measure the spectrum of the two or more replicas as a function of the varying relative amplitudes.

13. The system of claim 6, wherein the replicator comprises a moving birefringent element, a set of anisotropic elements and a polarizing element or set of polarizing elements.

14. The system of claim 6, wherein the replicator comprises a static set of optical components, as birefringent wedges, anisotropic elements and polarizing elements, intended to introduce the variation of the relative amplitude between the at least two replicas with respect to a spatial coordinate, being compatible with the analysing means operating in a single acquisition.

15. The system of claim 6, wherein the replicator comprises an interferometer or an acousto-optic device.

\* \* \* \* \*